(12) United States Patent
Rasmussen et al.

(10) Patent No.: US 6,745,089 B2
(45) Date of Patent: Jun. 1, 2004

(54) ADAPTABLE STATE BASED CONTROL SYSTEM

(75) Inventors: Robert D. Rasmussen, Monrovia, CA (US); Daniel L. Dvorak, La Crescenta, CA (US); Kim P. Gostelow, San Marina, CA (US); Thomas W. Starbird, Pasadena, CA (US); Erann Gat, Altadena, CA (US); Steve Ankuo Chien, Pasadena, CA (US); Robert M. Keller, Claremont, CA (US)

(73) Assignee: California Institute of Technology, Pasadena, CA (US)

( * ) Notice: Subject to any disclaimer, the term of this patent is extended or adjusted under 35 U.S.C. 154(b) by 495 days.

(21) Appl. No.: 09/776,573

(22) Filed: Feb. 1, 2001

(65) Prior Publication Data

US 2002/0026249 A1 Feb. 28, 2002

Related U.S. Application Data (60) Provisional application No. 60/179,596, filed on Feb. 1, 2000, and provisional application No. 60/179,493, filed on Feb. 1, 2000.

(51) Int. Cl.[7] .............................................. G05B 13/02
(52) U.S. Cl. ............................. 700/51; 700/28; 700/29; 700/30; 700/31; 700/52; 703/2
(58) Field of Search .............................. 700/28, 29, 30, 700/31, 51, 52, 75; 318/561; 703/2

(56) References Cited

U.S. PATENT DOCUMENTS

| | | | | |
|---|---|---|---|---|
| 3,838,257 A | * | 9/1974 | Ross ............................ | 700/29 |
| 4,635,182 A | * | 1/1987 | Hintz ........................... | 700/9 |
| 5,012,430 A | * | 4/1991 | Sakurai ........................ | 700/50 |
| 5,057,992 A | * | 10/1991 | Traiger ........................ | 700/52 |
| 6,112,126 A | * | 8/2000 | Hales et al. .................. | 700/29 |
| 6,285,971 B1 | * | 9/2001 | Shah et al. ................... | 703/2 |

OTHER PUBLICATIONS

Michael P. Georgeff, et al., "Reactive Reasoning and Planning," Robotics, 677–682.

Kurt Konolige, "Colbert: A Language for Reactive Control in Sapphira," Advances in Artificial Intelligence, vol. 1303 of Lecture Notes in Computer Science, 1997.

Pat Langley, "Machine Learning for Adaptive User Interfaces," In Proceedings of the 21st German Annual Conference on Artificial Intelligence, 1997, 53–62.

Drew McDermott, "Transformational Planning of Reactive Behavior," Yale University TR CSD RR–941, Dec. 1992.

Barney Pell et al., "An Autonomous Spacecraft Agent Prototype," In Proceedings of First International Conference on Autonomous Agents, 1997, 253–261.

(List continued on next page.)

*Primary Examiner*—Ramesh Patel
*Assistant Examiner*—Crystal J. Barnes
(74) *Attorney, Agent, or Firm*—Knobbe, Martens, Olson & Bear, LLP (57) ABSTRACT

An autonomous controller, comprised of a state knowledge manager, a control executor, hardware proxies and a statistical estimator collaborates with a goal elaborator, with which it shares common models of the behavior of the system and the controller. The elaborator uses the common models to generate from temporally indeterminate sets of goals, executable goals to be executed by the controller. The controller may be updated to operate in a different system or environment than that for which it was originally designed by the replacement of shared statistical models and by the instantiation of a new set of state variable objects derived from a state variable class. The adaptation of the controller does not require substantial modification of the goal elaborator for its application to the new system or environment.

37 Claims, 9 Drawing Sheets

OTHER PUBLICATIONS

Reid Simmons et al., "A Task Description Language for Robot Control," In Proceedings of Conference on Intelligent Robotics and Systems, 1998.

Reid Simmons, "Concurrent Planning and Execution for Autonomous Robots," IEEE Control Systems, 1992, 46–50.

Reid G. Simmons, "Monitoring and Error Recovery for Autonomous Walking," Proceedings of IEEE, 1992, 1407–1412.

Reid G. Simmons, "Structured Control for Autonomous Robots," IEEE Transactions on Robotics and Automation, vol. 10, No. 1, Feb. 1994, 34–43.

* cited by examiner

ADAPTABLE STATE BASED CONTROL SYSTEM

PRIORITY CLAIM

This application claims the benefit of priority under 35 U.S.C. §119(e) of U.S. Provisional Application No. 60/179,596 filed Feb. 1, 2000 and Provisional Application No. 60/179,493 filed Feb. 1, 2000, the disclosures of which are herewith incorporated by reference.

NASA CONTRACT

The invention described herein was made in the performance of work under NASA Contract No. NAS7-1407, and is subject to the provisions of Public Law 96-517 (35 U.S.C. §202) in which the Contractor has elected to retain title.

BACKGROUND OF THE INVENTION

1. Field of the Invention

The present invention relates in general to autonomous control systems and more particularly to goal-driven, state-based control systems that are readily adapted from one application to another.

2. Background

The control of complex highly automated systems has required the development of sophisticated techniques for planning the actions of the system, for acquiring data upon which to base those actions or to judge their effectiveness, and for executing the plans so developed. After initial action is taken, the control of such systems then further requires actions to continue in response to the initial actions taken, as well as to changed circumstances. This results in a need for the planning, response, and action systems to work in concert.

This is further complicated by the reality that in actual operation, the system must operate where the state of the environment around the control system and the state of the system being controlled are often only known in a probabilistic sense. This complicates the decision-making processes needed to plan the actions of the control system. A further difficulty is the presence of a temporal dimension to the control problem. Often the desired actions from the system must be performed within certain time windows. Other constraints may prevent the system from taking actions during other, possibly overlapping, time intervals, and still other constraints may effect the order in which actions may be taken.

To address this complex task with multi-dimensional constraints and statistical indeterminism, autonomous control approaches have attempted to simplify the problem by separating the statistical behavioral analysis, the control execution functions, and/or the planning and deliberation functions. By addressing each of these singly or in smaller groups, and providing an interface between them, development of the control system was made more tenable. However, this required the deliberative process to have an internal model that reflected, at some simpler level, the behavior of the other elements.

This solution resulted in the control system having a model of the system being controlled, and the universe in which it operated, inherently incorporated within the deliberative portions of the control system. As a consequence, the deliberation mechanisms become tightly coupled with the specifics of the system being controlled and the environment in which it is operating, while being disconnected from the detailed statistical behavior and actuator models. This has the consequence of producing a control system which can not readily be adapted if the system that is being controlled or the environment in which it operates is changed dramatically from that for which it was originally designed.

SUMMARY OF THE INVENTION

The one embodiment of the invention provides a system in which a controller for the control of a system operating within an external environment can be developed where common shared models of the system and controller behavior are maintained separate from the algorithms involved in the deliberative elaboration of goals upon the state of the system. One embodiment of the invention also provides methods in which the common shared models may be adapted for use in a second system operating in a second environment, or for the first system operating in an environment, outside of the scope envisioned during its use in the first environment. These adaptation methods allow for the adaptation of the controller to multiple uses while requiring minimum changes to the deliberative elaboration algorithms or substantial changes to their implementation. In this manner, the adaptation of the controller to multiple environments and problem spaces may efficiently be performed, based on a thorough knowledge of the system and the environment in which it operates while minimizing the required familiarity with deliberative goal elaborator, the algorithms employed in the elaborator, or the implementation of those algorithms.

This is achieved by creating a controller having components which manage and oversee the system in response to external goals on the behavior of the system and the controller, and changes in the external environment in which the system operates. These components perform via the use of defined state variables operating within a state knowledge manager, a control executor, a statistical state estimator, and a set of hardware proxies. These components utilize a set of shared models of the state variables of the system and its operating environment.

The shared models constitute the mechanism by which the components of the controller ensure that the behavior of the state variables are consistent among the components and are consistently defined and managed. In one embodiment of the controller, the state variables are implemented as object instantiations of a class of state variables. Each object having defined attributes and associated methods that allow the components of the controller to each meaningfully act on the state variable or in response to the value of attributes of the state variable. It is via these attributes and associated methods that the common model of the state variable behavior is maintained among the components of the controller.

The hardware proxies act as the object interfaces to the hardware sensors and actuators of the system. The attributes of these proxies correspond to the interfaces of the system hardware and the associated methods capture the behaviors of the sensors, including their dynamic performance, accuracy, and error modes. The hardware proxies provide to the statistical state estimation component, the measurements needed to update the estimated value and uncertainties associated with each state variable. These estimates are based also upon pre-existing values of attributes of the state variable including its statistical behavior, its uncertainty and its a priori value. The statistical state estimator updates the values of the attributes based upon the measurements provided by the hardware proxies and the previous attributes of the state.

The updated state variables are managed by the state knowledge management component of the system. This component enables the dissemination of the knowledge of the value of the attributes of the state variables to the other components of the controller as well as to the rest of the system, and, in some embodiments, as telemetry data. The state knowledge manager holds and manages the complete set of state variables and manages the relationships between them. For those state variables which are not estimated from measurements, but which are derived variables, that is to say are derived from combinations of other state variables, the state knowledge manager is responsible for updating the values of the derived state variables when one of the underlying basis variables is updated. The state knowledge manager also provides the mechanisms by which the state variable may be propagated between statistical estimator updates. To achieve this the state knowledge manager invokes the propagation method associated with the state variable.

The state control executor effects changes upon the state of the system in accordance with goals on the state received from a goal elaborator. This control is preferably affected without incorporating the specifics of the state behavior into the elaboration algorithms. The state control executor directs actions to the hardware proxies such that the system will respond in a way to meet the input state goals. In order to achieve this, the state control executor uses knowledge of the relationship between the system actuators and the state variables from the same models that are used in the statistical state estimation component.

The utilization of instantiated objects of the state variable class and shared common models for the behavior of the system is of benefit to the adaptation process. When it is necessary to use the system in a different operating environment, the system is modified in some manner (typically by hardware changes), or a new system is created, the controller may be adapted for use in the changed circumstances with a minimum of required changes to the deliberative elaborator. By substituting a second set of objects corresponding to the states of the second system, substituting a second set of hardware proxies, and substituting a second set of state estimation and state control models, the controller can be readily adapted to the new application with minimal changes to the implementation of the controller. This then transforms the adaptation of the controller from a complex job involving both knowledge of the system and software development expertise, to a job requiring only knowledge of the system and more basic software development expertise. This is preferably achieved by the use of an object oriented software system, implemented in a language such as C++ or Java, utilizing objects corresponding to the state variables of the system at the software's core.

For purposes of summarizing the invention, certain aspects, advantages and novel features of the invention have been described herein above. It is to be understood, however, that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

These and other features will now be described with reference to the drawings summarized below. These drawings and the associated description are provided to illustrate embodiments of the invention, and not to limit the scope of the invention.

DETAILED DESCRIPTION OF THE PREFERRED EMBODIMENT

In the following description, reference is made to the accompanying drawings, which show, by way of illustration, specific embodiments in which the invent may be practiced. Numerous specific details of these embodiments are set forth in order to provide a thorough understanding of the invention. However, it will be obvious to one skilled in the art that the invention may be practiced without the specific details or with certain alternative components and methods to those described herein.

Figure 1:
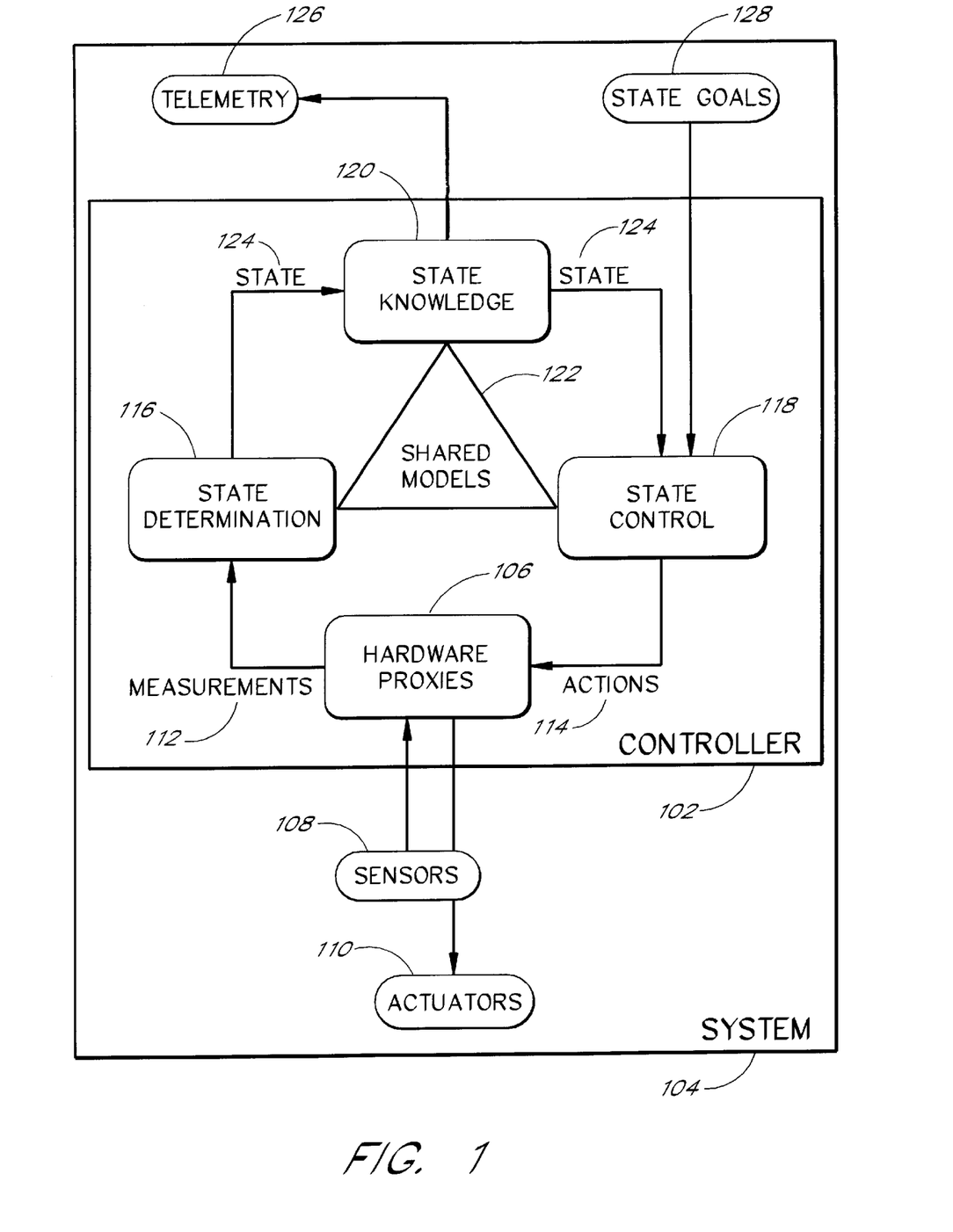
FIG. 1 is a block diagram illustrating the major functions of an embodiment of the adaptable state-based controller, and the system in which it operates.

FIG. 1 illustrates a controller 102 within an overall system 104. In one embodiment of the invention the system is an autonomous robotic spacecraft, however application to other systems where autonomous behavior is desired are also possible, including automobiles, trains, ships, aircraft, and other types of vehicles, as well as autonomous processing systems for chemical processing and factory operation. Indeed, embodiments of the invention may be used to control many systems, where autonomous behavior in the face of statistical and temporal indeterminancies is desired.

The autonomous behavior is enabled by the use of a controller 102 to control the behavior of the system 104. The controller 102 has a number of functional parts. These include hardware proxies 106. These proxies 106 are components within the controller 102 that serve as an interface to the actual hardware sensors 108 and actuators 110. The hardware proxies 106 contain software objects which have similar interface attributes as the actual hardware and provide access to the methods which can be supported in the hardware by providing corresponding object methods to the remainder of the controller 102. The hardware proxies 106 also provide measurements 112 from the sensors 108 that are fed into the second major component of the controller 102, which performs state determination 116.

The process of state determination 116 is generally performed via statistical state estimation. This estimation is frequently advisable as the measurements 112 provided from the hardware proxies 106 and the a priori knowledge that the controller has about the state of the system 104 are not perfectly known, but are known with a certain probabilistic uncertainty. Frequently the state 124 knowledge that is desired concerning the system 104 and the controller 102 is not directly measurable by any sensor 108 Additionally, the sensors 108 often only indirectly measure the state 124 of the system 104 by measuring phenomenon which are effected by the state 124 of the system or phenomenon which are effected by forces which effect the state 124 of the system 104. The measurements 112, whether directly of the state 124, or indirectly of related phenomenon, have measurement errors associated with them. The state determination component 116 of the controller 102 includes, preferably models for statistical measurement error associated with the measurements 112 as well as statistical models for the behavior of the system 104 and the controller 102. Standard statistical models including Poisson, Gaussian, and uniform distributions are preferably used, but other or custom statistical models may be used in the estimation process. The state determination component 116 will, preferably, use standard estimation filter strategies such as Kalman or Wiener filters, but may use a number of possible statistical filters to generate an estimate of the state 124 and its associated uncertainty.

The third component of the controller 102 is the state knowledge manager 120. The state knowledge manager 120 serves as the clearinghouse for state information and uncertainties to other portions of the controller 102 and the system 104. The controller uses shared models 122 of the state 124 and its uncertainty in conjunction with state determination 116. Through the use of shared models 122, the state determination 116 component of the controller receives a priori state information that it then uses in conjunction with measurements 112 to continue state determination 116, which produces a posteriori state estimates. These a posteriori estimates are used to feed future state determination updates. The state knowledge manager 120 also provides state information to other portions of the system 104 to be reported as system telemetry 126.

The fourth major component of the controller 102 is the state control function 118. The state control component 118 uses the same shared models 122 as state knowledge 120 and state determination 116 components and receives state information 124 and associated uncertainties calculated by state determination 116 and managed by the state knowledge manager 120. In addition, the state control 118 component receives state goals 128 sent to the controller 102 from the system 104. State control 118 determines the actions 114 that are given to the hardware proxies 106 in order to affect the actuators 110 of the system 104 to maintain the state goals 128.

In one embodiment, the state control 118, state knowledge 120, and state determination 116 components should use shared models 122 of the controller 102 and the system 104, rather than maintaining separate specific models. This has the advantage of having the models replaced consistently, if the nature and behavior of the controller 102 or the system 104 significantly changes. Additionally, there is no necessity to have to separately maintain consistency between the models used in the major components of the controller. The use of shared models 122 further minimizes excessive entanglement between the model and the implementations of the state knowledge 120, state determination 116, or state control 118 algorithms.

Figure 2:
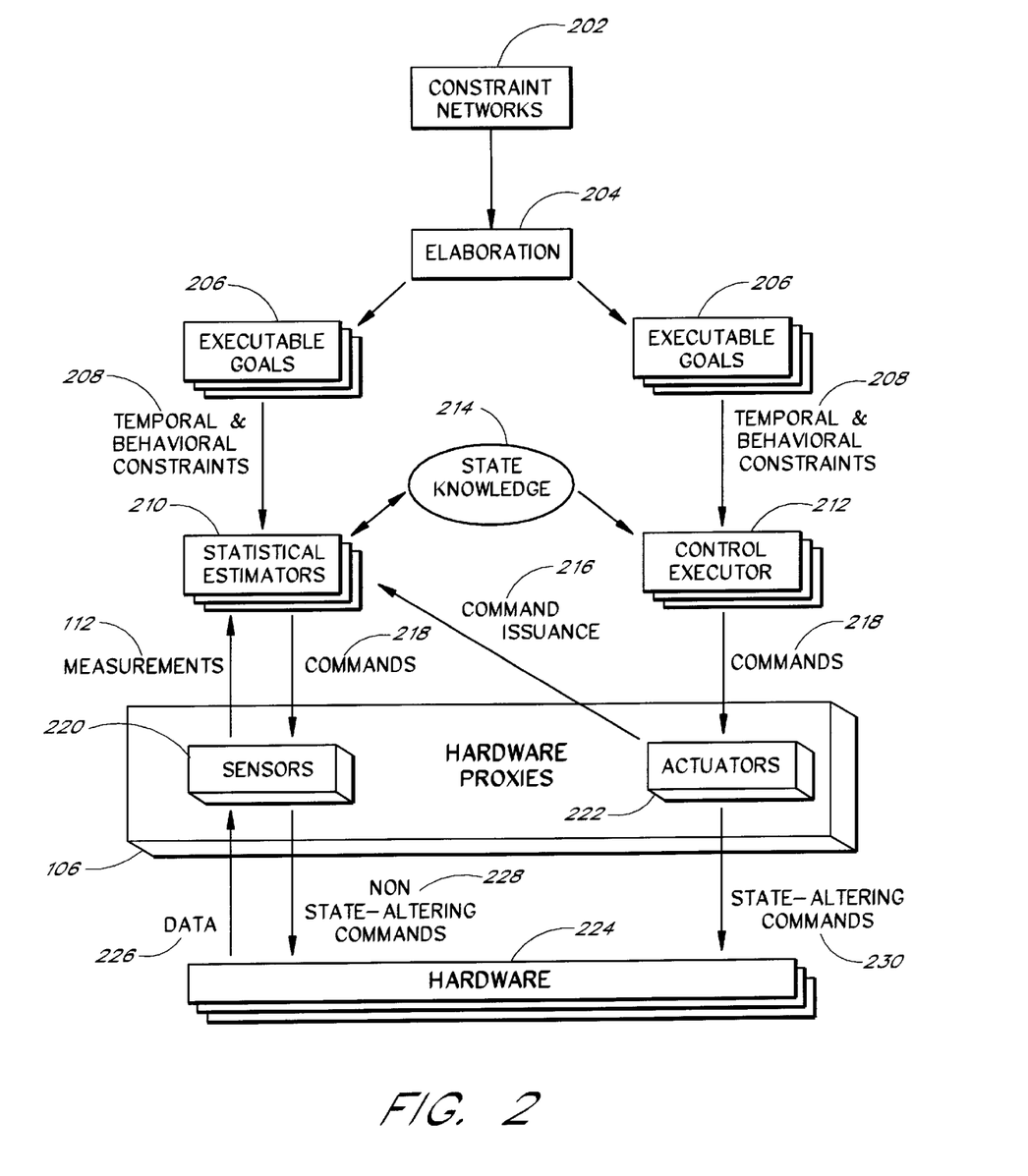
FIG. 2 illustrates the flow of data within an embodiment of the adaptable state-based controller system and the system in which it operates.

FIG. 2 illustrates flow of data within one embodiment of the invention and the logical separation of the temporal goal based aspects of the system 104 and the statistical models of the system 104 behavior. A constraint network 202 is defined which encompasses a network of temporal and behavioral constraints on the system 104 and the controller 102. These constraints 202 are expressed as high level behaviors of the system 104. In order to be utilized, they must be broken down into a series of more basic executable goals 206 that combine to achieve the higher level goal, through a process of elaboration 204. The elaboration 204 hierarchically decomposes goals into increasingly more basic goals, until a set of executable goals 206, which can directly be acted upon by the control executor 212 and the statistical estimators 210. These are expressed as a set of basic temporal and behavioral constraints 208. In this manner, the non-real time aspects of the control of the system 104, such as the deliberative, forward looking aspects of the control behavior may be separated from the near real-time responsive aspects of the system behavior. The execution of the latter being focused in the control executor 212 and the execution of the former being during elaboration 204.

The control executor 212 issues commands 218 to the hardware proxies 106 for the actuators 222. This in turn results in the issue of state-altering commands 230 to the actual system hardware 224. The control executor 212 commands 218 are issued in response to the temporal and behavior constraints 208 that are levied on the most basic set of controllable states of the system 104.

Elaboration 204 also results in executable goals 206 that lay temporal and behavioral constraints 208 on the behavior of the statistical estimators 210 within the controller 102. These constraints define the needed ability of the state estimators 210 to know the state knowledge 214 and uncertainty of the states of the system 104 and controller 102. In response to these constraints, the statistical estimators 210 issues commands 218 to the hardware proxies for the sensors 220, which trigger non state altering commands 228 to the system hardware 224 related to the configuration of the hardware 224 for the acquisition of data 226. This data 226 is the basis of measurements 112 which are used by the statistical estimators 210, along with the a priori state knowledge 214 and the acknowledgment of command issuance 216 by the actuator hardware proxies 222, to update the state knowledge 214.

In this manner, the mechanics of elaboration 204 are maintained preferably separately from the models of state knowledge 214 of controller 102 and system 104 behavior that are shared by the control executor 212 and the statistical estimators 210. This separation of goal elaboration 204 from the common modeling of system 104 behavior via state allows for ready adaptation of the controller 102 for use within other systems or operating environments that were not contemplated by a prior instantiation of the controller 102. The flow of the adaptation process is illustrated in FIGS. 3 through 6.

Figure 3:
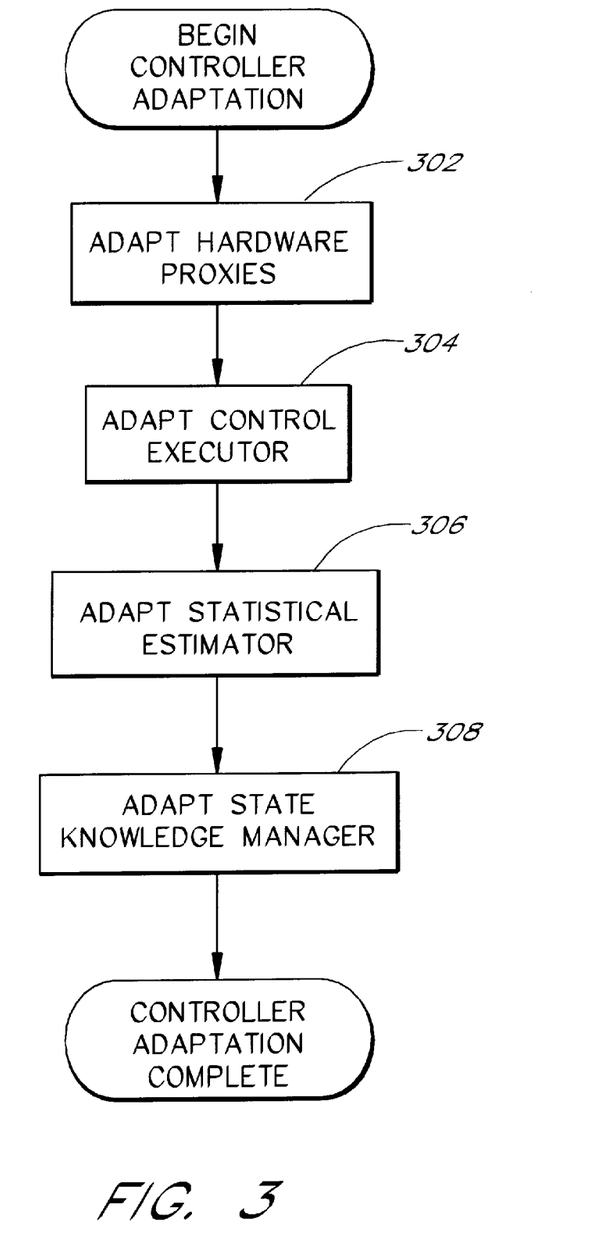
FIG. 3 illustrates, generally, steps in the process of adapting an embodiment of the adaptable state-based controller.

FIG. 3 shows the general flow of the adaptation process. In order to adapt the controller 102 to a new system 104 or environment, it is necessary to adapt the hardware proxies 302, in response to new hardware 224 or changed operating regimes; adapt the control executor 304 in response to a changed set of controlled states, or hardware proxies; adapt the statistical estimator 306 to work with changed statistical models of the system 104 or controller 102 behavior or new measurements from the changed hardware proxies 106; and to adapt the state knowledge manager 308 to accommodate the adapted set of states that are now being controlled by the control executor 212 and determined by the statistical estimator 210.

Figure 4:
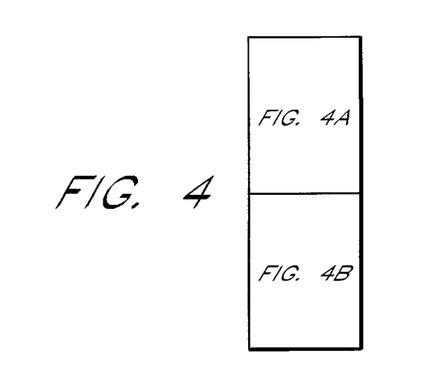
FIGS. 4A–B illustrates steps in the adaptation of the state knowledge manager within an embodiment of the adaptable state-based controller.
Figure 4A:
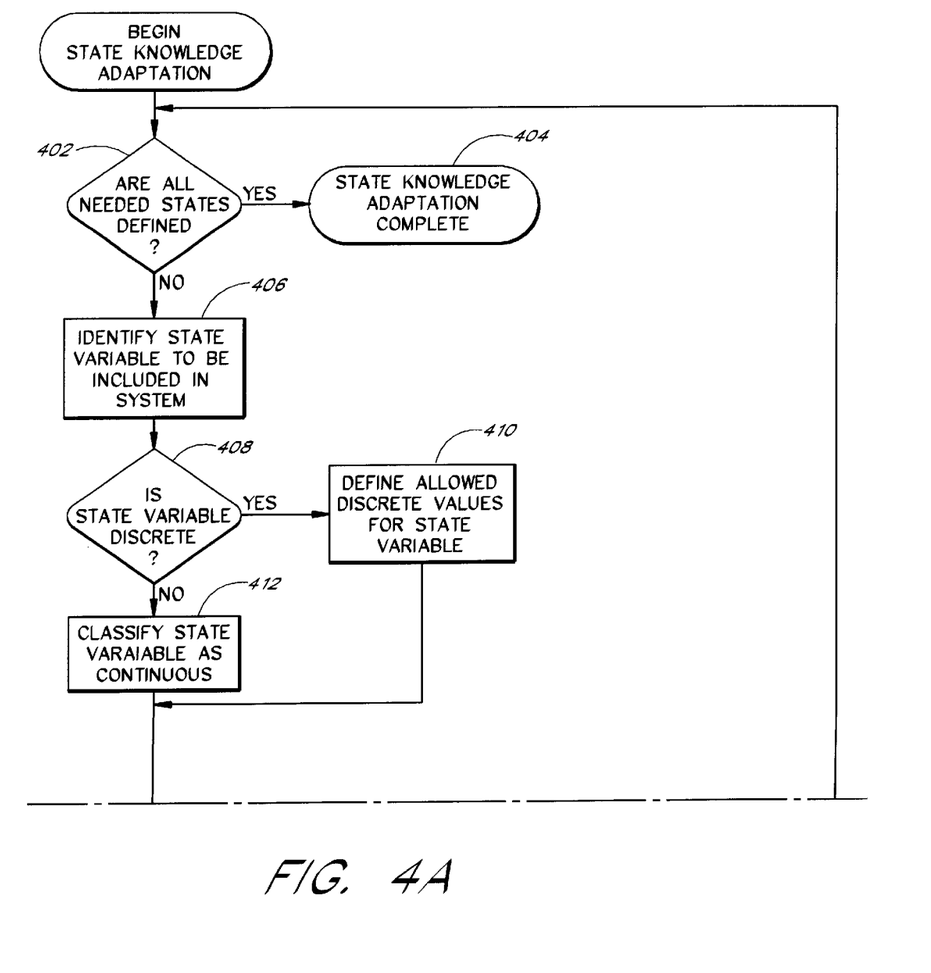
Figure 4B:
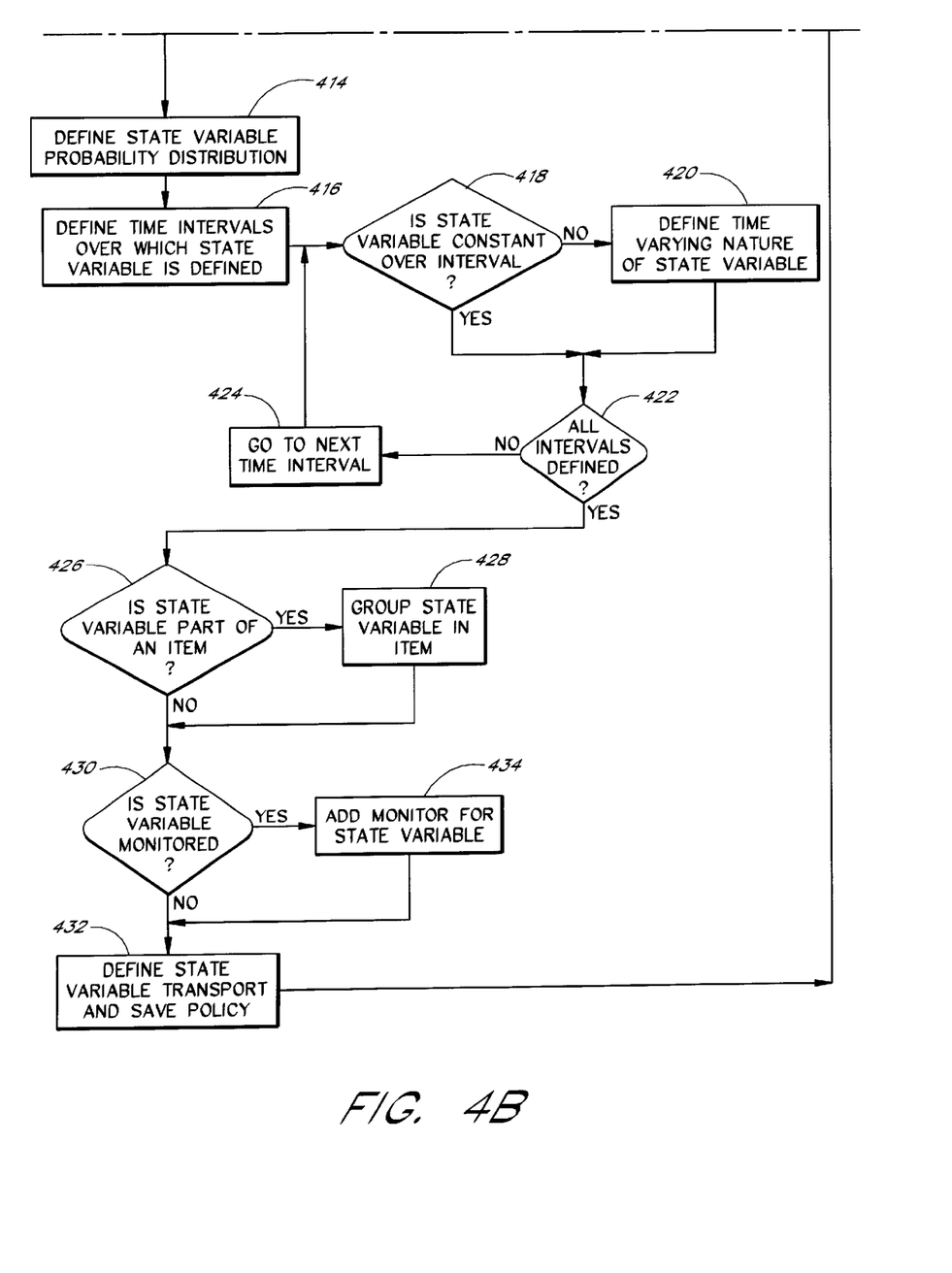

FIG. 4 shows in more detail the process involved in adapting the state knowledge manager 308. This is, basically, the process of defining the low level controlled states of the system 104 and the controller 102 that the control executor 212 may effect, and then defining the nature and character of the state variable.

It is necessary to perform the process of adapting the state knowledge manager 120 for all states needed for control of the system 104 A state variable which is needed for control of the system must first be identified and its nature defined 406. The nature of the state variable defines how it can be used. In one embodiment, state variables which are estimated by the statistical estimators 210 are designated basis variables. Variables which are simple transformations or combinations of basis state variables are defined as derived variables. Whether or not a state variable is a discrete variable is then determined 408. If the state variable is a discrete variable, the allowed values for the state variable are defined 410. Examples of discrete values may include lists of values or logical states, such as true or false. If the state variable is not a discrete variable, the state variable is defined as continuous 412.

The statistical probability distribution for the state variable must be defined 414. This may be a known standard probability distribution, such as uniform, normal, or Poisson, or may be some other special distribution.

For all time intervals over which the state variable is defined 418, the time varying nature 420 of the state variable shall be defined. This provides the state knowledge manager with sufficient information to propagate the knowledge of a state variable's value between updates of the statistical estimators 210. This continues until the definition for all intervals over which the state variable is defined are handled 422.

If the state variable is part of an item 426, this is defined 428. Items are groupings of state variables that have some logical significance. If the state variable is to be monitored 430, a monitor that alerts the system when the state variable meets some condition is defined 434.

The policy defining how often the state variable knowledge is saved and reported is defined 432. This is, generally, a consequence of the importance of the state variable and the need to robustly maintain knowledge of it.

These steps are repeated, until all states are defined. 402, at which time the adaptation of the state knowledge manager is complete 404.

Figure 7:
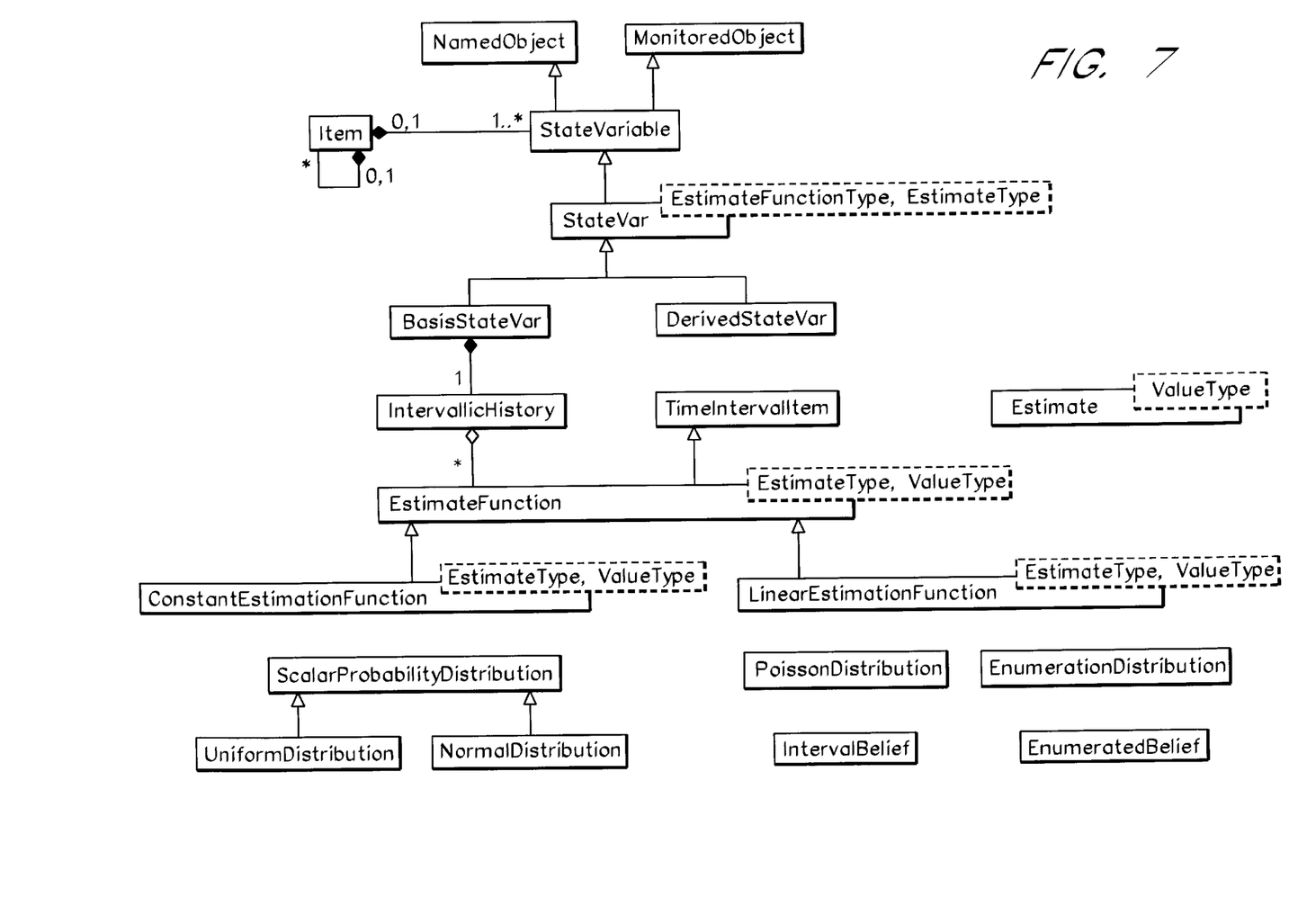
FIG. 7 illustrates a template class diagram in Unified Modeling Language (UML) notation for a state variable.

In one embodiment of the controller 102, this update process is achieved by modifying the attributes of a software object corresponding to the class diagram illustrated in FIG. 7. Each state variable is an instantiation of the class of state. In one embodiment, these are implemented in software using the C++ or JAVA programming languages. However, a number of other implementation mechanisms for implementing the object and classes having the preferred characteristics and attributes exist.

Figure 5:
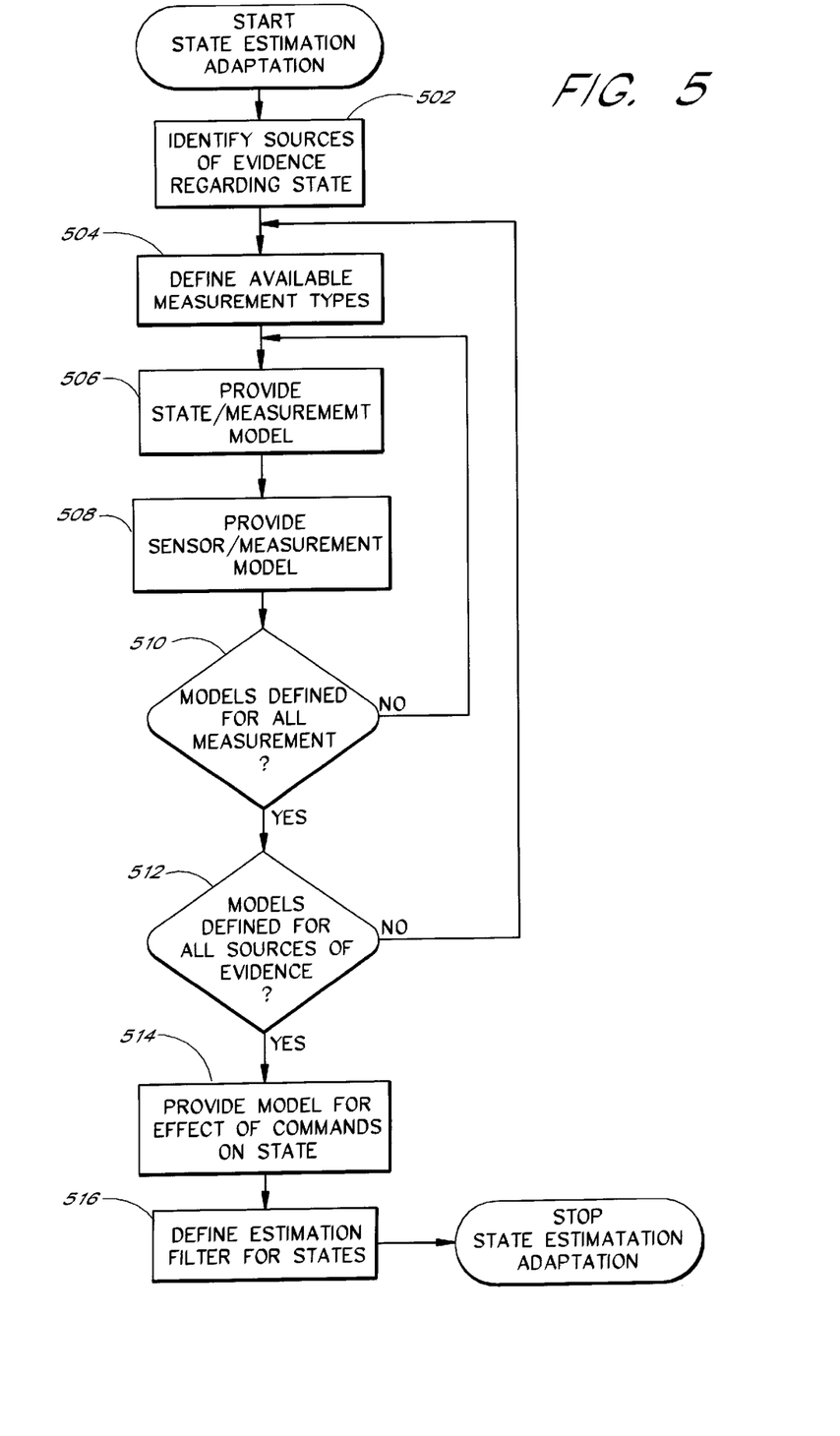
FIG. 5 illustrates steps in the adaptation of the statistical state estimator within an embodiment of the adaptable state based controller.

FIG. 5, illustrates the process of updating the state estimators. Sources of information concerning states to be controlled by the controller must be identified 502 and the available measurements corresponding to that source defined 504.

A model that defines the mapping of how a change in the state affects the measurement is provided 506, as well as a statistical model of the sensor performance effect on the measurement 508. This is done for all measurements 510 and all sources of evidence 512. The predicted effect of an issued command on state is defined 514. These steps define how the state of the system 104 and its environment will effect the measurements used by the statistical estimators. The actual inference of state and related uncertainties is performed by a particular estimation filter. The estimation filter used and its corresponding statistical behavior must be defined 516. In one embodiment of the system, the estimation filters are chosen from filters commonly familiar to one of reasonable skill in the art, such as Kalman, Wiener, or other current state, maximum likelihood estimation filters. However, in alternative embodiments, the estimation filter chosen may be as simple or as complex as needed to deal with the state space. In one embodiment of the controller 102, the choice of filter and related estimation models does not affect the operation of the elaboration process 204. The use of a state knowledge manager 120 and common models of system 104 and controller 102 behavior obviate the need to closely tie the design and implementation of the contemplative goal elaboration function 204 to the responsive control execution 212 and statistical estimation functions 210.

Figure 8:
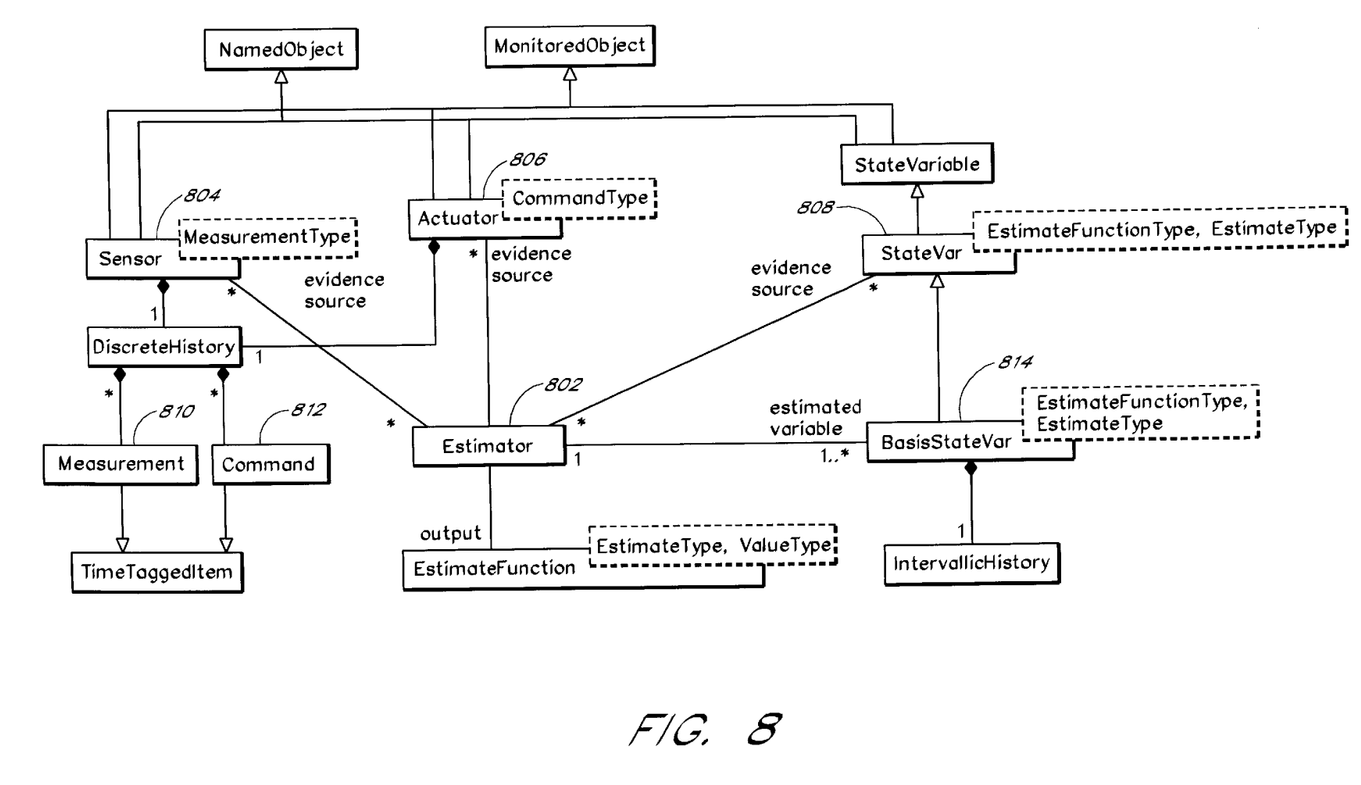
FIG. 8 is a class diagram framework in UML notation illustrating the relationship between sensor, estimator, and state variable classes.

In one embodiment of the controller 102, the statistical estimators 210 are implemented in software using an object oriented programming language such as C++ or JAVA, but other implementation options would be obvious to one of reasonable skill in the development of object oriented software. In one embodiment, the statistical state estimators 210 implement a framework class diagram as illustrated in FIG. 8.

Instances of estimator 802 may draw upon three kinds of evidence source: sensors 804 (providing measurements), actuators 806 (providing notification of issued commands), and state variables 808 (providing a priori estimates and estimates of related states). Class sensor 804 is a template class parameterized for the type of measurement that it can return. Each instance of sensor 804 contains a value history consisting of instances of measurement 810 and command 812. The output of estimator 802 is an estimated variable which is a basis state variable 814 managed by the state knowledge manager 120.

Figure 6:
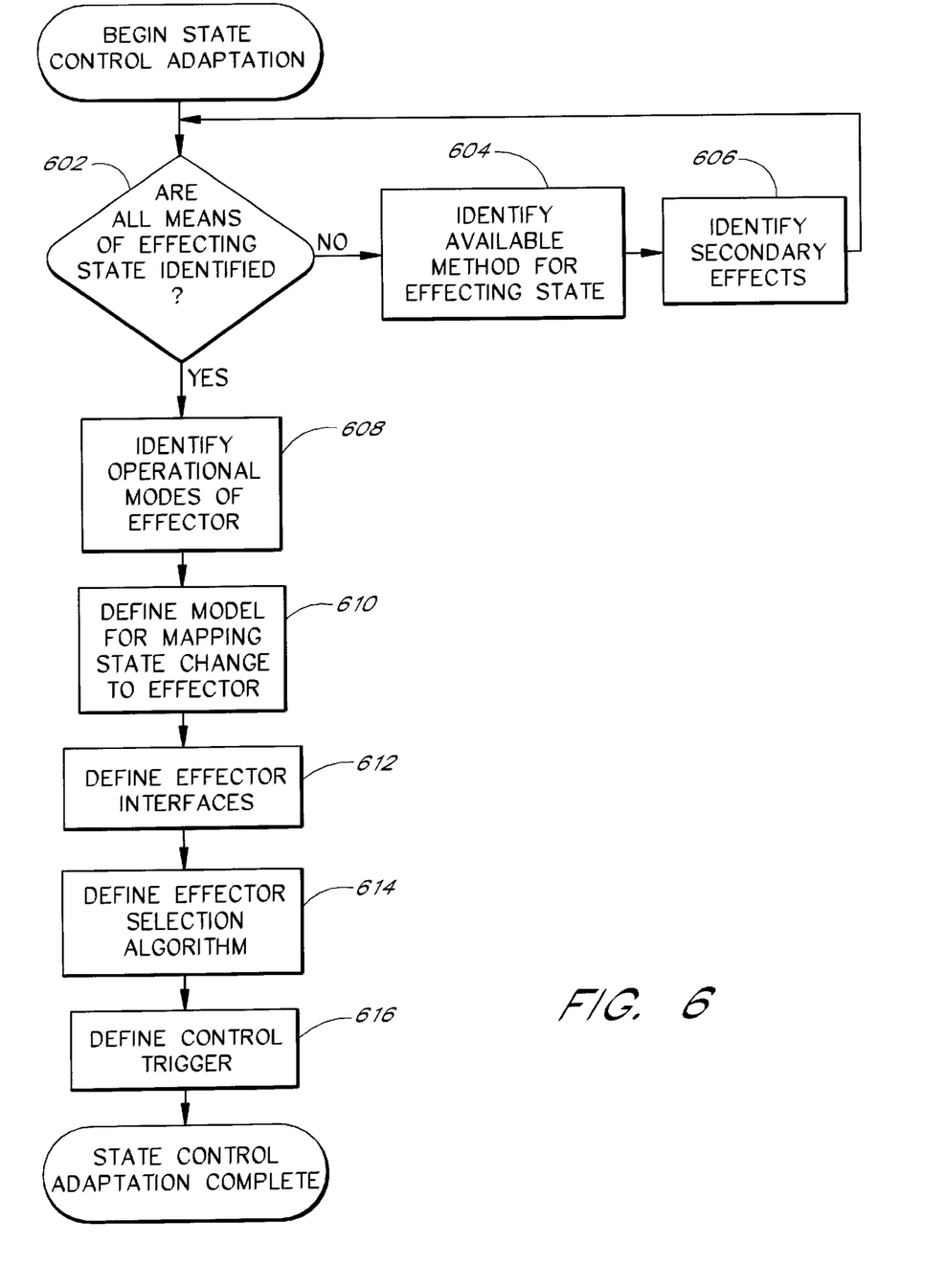
FIG. 6 illustrates steps in the adaptation of the control executor within an embodiment of the adaptable state-based controller.

FIG. 6 illustrates the flow of adaptation of the state control executor. For each available method of affecting the state of the system 602, the primary 604 and secondary effects 606 of that method must be identified.

The operational modes of the effector are identified 608. A model for mapping a desired state change to a required change in the effector 610 must be defined for each mode of each effector. The effector interfaces are then defined 612 and an algorithm for selecting which effector to use to affect the change in a state must be defined 614. Lastly, the control trigger model 616 which defines when an effector will be used to change the state is defined.

In one embodiment of the system, the effectors are implemented in software as objects comprising instances of a set of template classes. These are implemented in C++ or JAVA preferably, although other object oriented software implementation options are available.

The use of a state-driven approach with common shared models between statistical estimators 210, state knowledge managers 214, and control executors 212, and the separation maintained between the contemplative goal elaboration mechanisms 204 and state control mechanisms 102, enables the creation of a readily adaptable controller 102 which is capable of coping with both temporal and statistical indeterminance. This further has the advantage that the process of adapting the controller 102 from one system or operational environment to a dramatically different environment does not require a restructuring or redesign of the elaboration mechanisms 204, but the definition and instantiation of the shared models underlying the controller 102. This reduces the problem of adaptation from being a task requiring the detailed involvement of both people familiar with and skilled in the systems in question and people familiar with design and implementation of elaboration mechanisms to a process only emphasizing the former. The process of adaptation is greatly simplified and constrained to the implementation of system 104 models.

Although embodiments of the controller 102 deals with the control of an autonomous system 104, in alternative embodiments only portions of a complex system may be addressed or only subsets of states of a system controlled. Examples of this would include control of the guidance and navigation of a vehicle, where the only states, sensors, and actuators in question are those pertaining to the control of the physical location or orientation of the vehicle. For a spacecraft this would include thrusters, valves, engines, momentum wheels, propellant assemblies, etc. For an automobile, this would include steering, braking, and engine control.

Other such alternative embodiments include the control of data management and communication systems. In this alternate embodiment the location of pieces of information can be controlled via actuators and sensor constituted by the physical communications and routing equipment used in the system. This approach to the problem of data management and communications control has the advantage that multiple routing mechanisms can be efficiently dealt with and scaling and addition of new hardware and communications paths is a controller adaptation as described herein.

Control of power and power distribution system may also be addressed by an alternative embodiment of the invention. The states to be controlled including available current and voltage at defined points within the system. The actuators are power sources, loads, switches, variable resistance and storage devices.

Similarly, the thermal control of an environment may be controlled using such a system. The states to be controlled are defined as the relative and absolute temperatures at locations within the system. The types of actuators and sensors available would depend on the application environment, which might be the thermal control of a spacecraft, a building, or an electronics assembly.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow. In the method claims, reference characters are used for convenience of description only, and do not indicate a particular order for performing the method.

What is claimed is:

1. An autonomous system that is controlled based on temporal constraints placed upon the behavior of the autonomous system and statistically indeterminate knowledge about the behavior of the autonomous system, the autonomous system comprising:

multiple hardware proxies which provide an interface between a controller and system hardware;

a statistical state estimator, which provides statistical estimated values and estimated uncertainty values of the state of the system and the controller in response to temporal and behavior constraints and based upon measurements received from the hardware proxies;

a control executor that is configured to issue commands to the hardware proxies based upon temporal and behavioral constraints on the system, the statistical estimated values, and the estimated uncertainty values;

a state knowledge manager which is configured to coordinate the use the statistical estimates and uncertainties the state of the system; and a set of common models for the behavior of the system, the controller, and the external environment, wherein the common models are used by the state estimator, the control executor, and the state knowledge manager.

2. The autonomous system of claim 1, wherein the controller may be adapted for use in a second system or in a second external environment, by substituting a second set of common models for the first set of common models.

3. The autonomous system of claim 1, wherein the control executor, state knowledge manager, and statistical state estimator are implemented as a first set of collaborating objects in an object-oriented software system.

4. The autonomous system of claim 3, wherein the control executor, the state knowledge manager, and the statistical state estimator are adapted for use in a controller operating in a second system or in a second external environment by substituting a second set of collaborating objects for the first set of collaborating objects.

5. An autonomous system that is controlled based on temporal constraints placed upon the behavior of the autonomous system and statistically indeterminate knowledge about the behavior of the autonomous system, the autonomous system comprising:

multiple hardware proxies which provide an interface between a controller and system hardware;

a statistical state estimator, which provides statistical estimated values and estimated uncertainty values of the state of the system and the controller in response to temporal and behavior constraints and based upon measurements received from the hardware proxies;

a control executor that is configured to issue commands to the hardware proxies based upon temporal and behavioral constraints on the system, the statistical estimated values, and the estimated uncertainty values;

a state knowledge manager which is configured to coordinate the use the statistical estimates and uncertainties the state of the system;

a set of common models for the behavior of the system, the controller, and the external environment, wherein the common models are used by the state estimator, the control executor, and the state knowledge manager; and a goal elaborator, wherein the goal elaborator hierarchically decomposes goals on the behavior of a derived state of the system into goals on a set of state variables which define the derived state of the system.

6. The autonomous system of claim 5, wherein the goal elaborator converts goals expressed with temporal indeterminance into goals on the behavior of the state of the system.

7. The autonomous system of claim 6, wherein the set of common models may be substituted with a second set of common models without modifying the goal elaborator.

8. The autonomous system of claim 7, wherein the first and second set of common models are implemented as object instantiations of a class of state variables corresponding to, and having the values of the attributes of, the first and second set of state variables.

9. A method of autonomous control which shares information about a set of state variables with a goal elaborator and a controller, the method comprising:

generating with a goal elaborator, desired values associated with a set of state variables wherein the state variables define the condition of an autonomous device;

generating with a controller, estimated values associated with the set of state variables;

generating with the controller, estimated uncertainty values associated with the estimate values; and sharing with the goal elaborator and the controller, the desired values, the estimated values, and the estimated uncertainty values.

10. The method of claim 9 wherein the act of generating the desired values further comprises hierarchically decomposing goals on the behavior of a derived state of the system.

11. The method of claim 9 wherein the act generating the desired values further comprises hierarchically decomposes goals on the behavior of a derived state of the system into goals on a set of state variables which define the; derived state of the system.

12. The method of claim 9 wherein the act of generating the estimated values is based upon temporal and behavioral constraints on the system.

13. The method of claim 9 wherein the act of generating the estimated values is based upon statistical estimates.

14. The method of claim 9 wherein the act of generating the estimated uncertainty values is based upon uncertainties of the state of the system.

15. A method of control comprising:

generating with an elaborator, a set of desired values that are associated with a set of state variables;

generating with a controller, a set of estimated values that are associated with the set of state variables;

generating with a controller, a set of estimated uncertainty values that are associated with the estimate values; and sharing with both the elaborator and controller, the desired values, the estimated values, and the estimated uncertainty values.

16. The method of claim 15 wherein the act of sharing is performed by a state knowledge manager that is in communication with the elaborator and controller.

17. The method of claim 15 wherein the act of generating the set of estimated values is in response to temporal constraints.

18. The method of claim 15 wherein the act of generating the set of estimated values is in response to temporal and behavior constraints.

19. The method of claim 15 wherein the act of generating the set of estimated values is in response to temporal constraints, behavior constraints and upon measured data.

20. The method of claim 15 wherein the act of generating the set of estimated uncertainty values is in response to temporal constraints.

21. The method of claim 15 wherein the act of generating the set of estimated uncertainty values is in response to temporal and behavior constraints.

22. The method of claim 15 wherein the act of generating the set of estimated uncertainty values is in response to temporal constraints, behavior constraints and upon measured data.

23. A method of autonomous control that combines temporal elaboration with statistical modeling, the method comprising:

generating with a controller statistically estimated values associated with a set of state variables;

generating with a controller statistically estimated uncertainty values associated with the statistically estimated values; and generating with a goal elaborator a set of desired values associated with a set of state variables wherein the act of generating the desired values is based on the statistically estimate values, statistically estimated uncertainty values and a set of temporally indeterminate goals.

24. The method of claim 23 wherein the act of generating the statistically estimated uncertainty values is based on statistical models associated with the controller and the desired values generated by the elaborator.

25. A method of autonomous control that combines temporal elaboration with statistical modeling, the method comprising:

generating with an elaborator based on a set of temporally indeterminate goals, desired values associated with a set of state variables; and generating with a controller statistically estimated values associated with the set of state variables wherein the act of generating the statistically estimated values is based on statistical models associated with the controller and the desired values generated by the elaborator.

26. The method of claim 25 further comprising generating with the controller statistically estimated uncertainty values based on statistical models associated with the controller, the statistically estimated values, and the desired values generated by the elaborator.

27. A control apparatus comprising:

an elaborator which is configured to generate a set of desired values, wherein the set of desired values are associated with a set of state variables;

a controller which is configured to generate a set of estimated values that are associated with the set of state variables, the controller further configured to generate a set of estimated uncertainty values that are associated with the estimate values; and wherein the controller and elaborator are configured to share the desired values, the estimated values, and the estimated uncertainty values.

28. The control apparatus of claim 27 further comprising multiple hardware proxies which provide measurement data to the controller.

29. The control apparatus of claim 27 wherein the controller further comprises a statistical state estimator, which provides the estimated values and the estimated uncertainty values in response to temporal and behavior constraints.

30. The control apparatus of claim 27 further comprising a set of common models for the behavior of the system, the controller, or an external environment.

31. A method of reconfiguring a controller and an elaborator associated with a first autonomous system so that the controller and elaborator can direct a second autonomous system, the method comprising:

replacing a first set of state variables associated with a first autonomous system with a second set of state variables associated with a second autonomous system;

replacing a first set of statistical models associated with the first set of state variables with a second set of statistical models associated with the second set of state variables; and automatically sharing with the elaborator and controller, data associated with the second set of state variables.

32. An method of adapting the use of an autonomous controller configured to operate within a first system for a second system, wherein the adaptation comprises:

(A) replacing a first set of state variables associated with a first system and with a second set of state variables associated with a second system;

(B) identifying attribute values associated with members of the second set of state variables;

(C) replacing a first set of statistical models that estimate and predict the behavior of the first system with a second set of statistical models that estimate the behavior of the second system;

(D) replacing a first set of models for the behavior of sensors and actuators in the first system with a second set of models of the behavior of sensors and actuators in the second system; and (E) sharing with an elaborator and a controller, the second set of state variables and the behavior of the second system predicted by the statistical models.

33. The method of claim 32, wherein (A) and (B) are achieved by instantiating a set of software objects of a state variable class corresponding to, and having the values of the attributes of, the set of state variables of the second system.

34. The method of claim 32, wherein the attributes of the set of state variables of the second system include the definition of the probability distribution of the state variables of the second system.

35. The method of claim 32 wherein (B) comprises:

(B-1) defining a member of the set of state variables of the second system as a discrete or continuous variable;

(B-2) defining the probability distribution of the member of the set of state variables of the second system;

(B-3) identifying a time interval over which the member of the set of state variables of the second system is defined; and (B-4) producing a mathematical model for the time varying nature of the member of the set of state variables for the second system during the time interval over which the member of the set of state variables of the second system is defined.

36. The method of claim 35, wherein (B) further comprises:

(B-5) describing a set of monitoring criteria which delineate conditions when the value of the member of the set of state variables of the second system will result in a notification of the condition being met being transmitted to a control executor within the controller.

37. The method of claim 32, wherein (C) comprises:

(C-1) identifying a source of evidence relating to a member of the set of state variables of the second system;

(C-2) identifying a measurement from the source of evidence relating to a member of the set of state variables of the second system;

(C-3) defining the mathematical relationship between the member of the set of state variables of the second system and the measurement from the source of evidence;

(C-4) defining the statistical uncertainty distribution for the measurement from the source of evidence;

(C-5) defining the effect of a command issued to an actuator on the member of the set of state variables of the second system; and (C-6) defining the estimation filter algorithm to be used estimate the value of, and the uncertainty in the knowledge of, the member of the set of state variables of the second system.

* * * * *